TRANSMISSION SYSTEM

Filed March 11, 1960

INVENTOR
Karl Wilhelm

BY George H. Spencer

ATTORNEY

United States Patent Office 3,040,132

Patented June 19, 1962

3,040,132

TRANSMISSION SYSTEM

Karl Wilhelm, Hannover, Germany, assignor to Telefunken G.m.b.H., Berlin, Germany Filed Mar. 11, 1960, Ser. No. 14,430
Claims priority, application Germany Mar. 14, 1959
5 Claims. (Cl. 179—15)

The present invention relates to an electrical system and an electrical circuit therein for the transmission of stereophonic audio signals by means of a carrier frequency.

It has been known to transmit the two channels necessary for stereo reproduction on a single modulated carrier frequency, which carrier, for example, may be radio broadcasted from a radio transmitter station. At the transmitter station, the transmitter channel is periodically switched between the two stereo microphone channels. The switching is carried out at a supersonic frequency of, for example, 30 kilocycles per second. In the receiver, the single transmission channel is also switched periodically between the two loudspeaker channels for the stereo reproduction. In order to have exact synchronism of the switching in the transmitter station and the switching in the various receivers, the switching frequency of, for example, 30 kilocycles per second, is also transmitted as modulator signal of the carrier transmission frequency.

Devices of this type are variously described, for example, in the German Patents Nos. 826,002, 893,514 and 967,132.

It has also been known to use phase comparison circuits for comparing received input signals of a given frequency with the signals generated in a local oscillator. If the phase comparison circuit is, for example, a transformer with a rectifier bridge in cathode-to-anode connection, and if the inputs of the local oscillator and of the received signal are fed to this comparison circuit by separate inductively coupled input circuits, the rectifier bridge will produce an output which is equal to zero only as long as the two signals are out of phase by 90°. If this output of the bridge is fed to the local oscillator as a control signal, this oscillator, in turn, will automatically produce an output signal which is, in fact, always 90° phase shifted, as compared with the received input signal.

If such phase comparison circuit is used to control the synchronism of the switching device for a stereo transmission, as outlined above, the locally produced oscillations of the supersonic control and switching frequency have a phase position which is 90° out of phase with respect to the transmitted supersonic frequency, and the latter is in synchronism with the alternating signals for the two stereo channels. Thus, a phase-shifting device in the receiver must be provided before the signals produced by the local oscillator may be used to connect the two loudspeakers of the stereo reproduction system alternately to the audio input transmission channel.

Therefore, it is an object of the present invention to provide a new and improved transmission system for stereo signals via a single channel which is simpler than the systems known in the prior art.

It is another object of the present invention to provide a new and improved switching arrangement to connect two loudspeaker channels alternately to a single transmission channel, through which transmission channel stereo signals are fed in alternating succession.

According to one aspect of the invention, a carrier frequency is modulated alternately with the audio signals of two stereo pick-up channels, the alternations being caused by and in synchronism with an oscillator producing a supersonic frequency. The carrier signal is further modulated with this supersonic frequency but with a phase shift of 90°, as compared with the alternations of the switching. At the receiver station, a phase comparison circuit picks up the output of a demodulator of the carrier. The phase comparison circuit compares the supersonic frequency signal as received with signals produced by a local oscillator of the same frequency. The result of the comparison is utilized to control the local oscillator, the same phase comparison circuit also serving as a switching device for the audio demodulated input signals. The local oscillator controls the switching so that the audio signal channel is connected alternately to the two loudspeakers of the stereo reproduction system.

The invention, the objects of the invention and further objects and advantages thereof will be understood best from the detailed description of the accompanying drawing, in which.

Figures 1, 2:
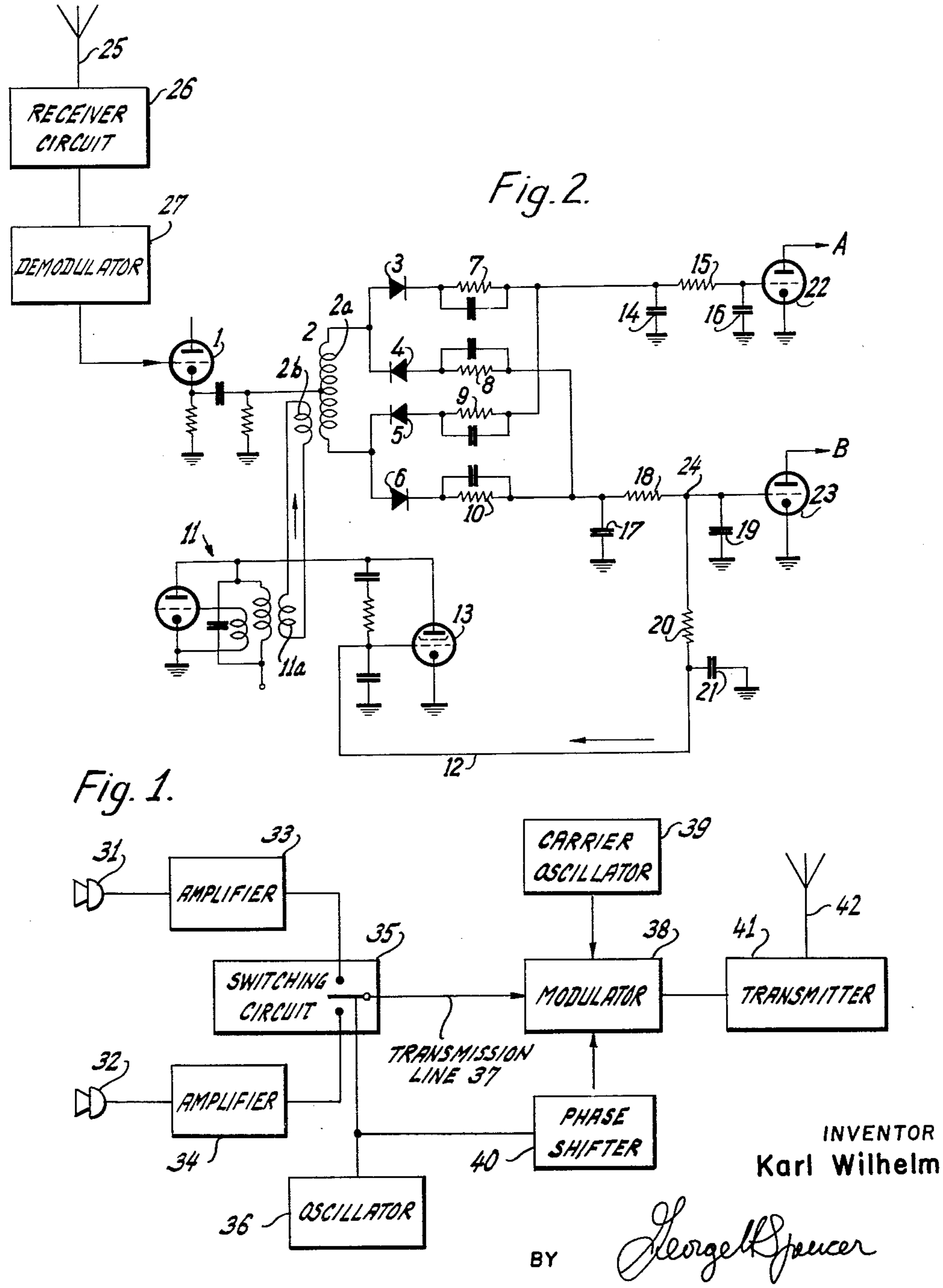
FIGURE 1 is a block diagram of a transmitter station as one part of the system according to the present invention.
FIGURE 2 is a circuit diagram of a receiver which is a corresponding part of the system according to the invention, complementing the transmitter as shown in FIGURE 1.

In FIGURE 1, 31 and 32 denote two microphones of a stereophonic pick-up device feeding amplifiers 33 and 34, respectively. The outputs of the two amplifiers are fed to an electronic switching circuit 35 controlled by an oscillator 36 which produces a switching frequency of, for example, 30,000 c.p.s. The switching circuit 35 alternately connects the outputs of amplifiers 33 and 34 to a transmission line 37 which feeds a modulator 38. In the modulator 38, the signal as it appears in line 37 is modulated on a carrier wave produced by a carrier oscillator 39. The oscillations produced by oscillator 36 are also fed to a phase shifter 40 which shifts the oscillation by 90°. The phase-shifted oscillation is then fed to the modulator 38 and is superimposed upon the carrier as an additional modulation. The modulated carrier is fed to a transmitter 41 and broadcasted by means of a transmitter antenna 42.

It will be appreciated that every one of the individual components 31 to 42 is conventional, the present invention residing in the combination thereof, as shown.

The signal as broadcasted by the transmitter station shown in FIGURE 1 is received by a receiver shown in FIGURE 2 and, particularly, by an antenna 25, a receiver circuit 26 and a demodulator 27. The output of demodulator 27 now produces a signal which includes in alternating succession the audio components of the stereo pick-up system 31 and 32 in FIGURE 1, and it further contains the supersonic switching frequency as an additional signal, said latter signal being out of phase by 90°, as compared with the alternating audio pulses.

These signals are fed through a triode 1 to a phase comparison circuit which includes a transformer 2 and rectifiers 3, 4, 5 and 6, arranged in anode-to-cathode connection. Triode 1 is a cathode follower and the cathode is connected to a center tap of the secondary winding **2*a* of transformer 2. One terminal of this winding 2*a* is connected to the junction of rectifiers 3 and 4, while the other terminal is connected to the junction of rectifiers 5 and 6. Resistance-capacitance combinations 7, 8, 9 and 10 are connected in series with the rectifiers 3, 4, 5 and 6**, respectively. Thus, each rectifier operates as a peak rectifier.

The four rectifiers, including the resistance-capacitance combinations in circuit therewith, form a bridge circuit and the transformer winding **2*a* is connected across one diagonal thereof. The corners of the bridge not pertaining to this diagonal are connected to two loudspeaker channels A and B, respectively, including pre-amplifiers 22 and 23**, respectively.

The primary winding **2*b* of transformer 2 is connected to the output circuit 11$a$ of a local oscillator 11**, producing electric oscillations of supersonic frequency, for example 30,000 c.p.s. This local oscillator for supersonic frequency biases the rectifier arrangement in that it opens and blocks the rectifiers alternately in synchronism with the supersonic oscillation, so that the two loudspeaker channels A and B are also alternately opened and blocked.

The bridge arrangement for the rectifiers has been selected in order to prevent the switching A.C. voltage produced by the local oscillator 11 from entering the loudspeaker channels A and B. Filters, made up of capacitor and resistor components 14, 15, 16 and 17, 18, 19 for the channels A and B, respectively, serve additionally for suppressing the supersonic switching frequency.

The audio signal as transmitted from triode 1 to the transformer 2 is a mixed signal of the two stereo components in that it includes alternately these two components as a series of successive pulses having an alternating frequency corresponding exactly to the supersonic frequency produced by the oscillator 11. When at any given moment a signal component for channel B is transmitted, the voltage induced by the oscillator in the transformer secondary 2$b$ has such a polarity that it opens rectifiers 6 and 4. Dependent upon the momentary polarity of the audio signal, it will reach channel B through rectifier 4 or 6. Rectifiers 3 and 5 are opened when the oscillator 11 produces in the secondary winding 2$a$ a half wave of opposite polarity and, during this period of time, a component for channel A may reach tube 22 through rectifier 3 or 5, dependent upon the momentary polarity of the signal designated for channel A.

Thus far, it has been assumed that the output of oscillator 11, as it appears across winding 2$a$, oscillates in phase and frequency synchronism with the alternations of the components for the two channels A and B at the supersonic frequency. To ensure this phase and frequency synchronism, one of the transmission channels is tapped at a junction 24, the latter being so selected that the filter elements 17 and 18 also serve as deemphasizing elements. At junction 24, there appears a D.C. component which depends upon a deviation from the 90° phase shift between the oscillator 11 and the supersonic modulator frequency as it is fed to the bridge. This D.C. voltage thus represents any phase error that is present and it is fed to a feedback line 12 via a filter made up of resistance 20 and capacitance 21 for removing the audio components from the D.C. feedback signal. The signal in line 12 is fed to a control tube 13 which is, in fact, a dummy tube of the oscillator 11. In case the voltage oscillations produced by oscillator 11 are in synchronism with the supersonic modulator frequency as also transmitted, no regulating voltage will appear when the supersonic signal as transmitted is phase-shifted by 90° relative to the oscillations of the local oscillator 11. In this case, the vector sums of the local oscillations as transmitted to the secondary 2$a$ of transformer 2 and of the supersonic frequency as transmitted via tube 1 directly to the windings 2$b$ are equal at the two end terminals of the secondary 2$a$ and cancel each other across the two rectifier pairs 4, 6 and 3, 5. Thus, no signal actually is fed into line 12. Only in case these vector sums are not equal, due to a different phase angle of these two supersonic frequencies, a D.C. control voltage appears in line 12 and oscillator 11 is shifted into synchronism by feedback control until the control voltage in line 12 disappears.

As is apparent from the foregoing description, the transformer 2 and the rectifiers 3 to 6, connected in bridge circuit, serve as a switching device for the two alternating stereo components to be selectively fed to channels A and B. The same transformer-rectifier arrangement serves also as phase comparison circuit for the switching voltage as produced by the local oscillator and transmitted with the audio signal. The result of this comparison automatically controls the local oscillator. It will be observed that no phase shifting device is provided in the receiver circuit and the switching frequency obtains the desired phase angle at the radio transmitter from which the audio signal is transmitted.

Furthermore, it will be observed that, due to the 90° phase shift of the switching frequency, as produced in the radio transmitter (FIGURE 1), this audio frequency has its maximum amplitude between two audio components for channels A and B, respectively, alternating at the same supersonic frequency. Thus, the control amplitude range of the entire signal train as transmitted will not be reduced too much for the audio signals due to the simultaneously transmitted supersonic control frequency.

It will be understood that the above description of the present invention is susceptible to various modifications, changes and adaptations, and the same are intended to be comprehended within the meaning and range of equivalents of the appended claims.

I claim:

1. A system for the transmission of stereophonic signals over a single carrier frequency comprising: a transmitter modulator; two stereo microphone channels; a switch for periodically and alternatingly connecting said channels to said transmitter modulator; a control oscillator connected to said switch for supplying thereto oscillations of supersonic frequency; a phase shifter connected to the output of said oscillator for producing a 90° phase shift; means for connecting the output of said phase shifter to said modulator; means for transmitting and receiving the output of said modulator; a phase comparison circuit; a second oscillator producing oscillations of the same supersonic frequency; a demodulator for feeding the modulations of said modulator output as received to said comparison circuit; two stereo channels connected to opposite branches of said comparison circuit; means for feeding the output of said second oscillator to said comparison circuit for alternatingly connecting said channels to said demodulator via said comparison circuit; and means for feeding a signal responsive to the result of comparing the phase position of said two supersonic signals from said comparison circuit to said second oscillator.

2. An electrical circuit for selectively and alternatingly feeding pulses to two separate channels for superimposing a control frequency upon said pulses, said circuit comprising: a rectifier bridge including four rectifier elements in cathode-to-anode connection; a first winding connected across one diagonal of said bridge; two output channels separately connected to the remaining two bridge corners; an oscillator producing oscillations of a frequency similar to said superimposed control frequency; a second winding inductively coupled to said first winding and connected to said oscillator for transmitting the oscillations produced by the oscillator to said first winding; direct current potential conductive means interconnecting one of said last-mentioned bridge corners and the control circuit of said oscillator; and means for feeding said pulses and said superimposed frequency to a center tap of said first winding.

3. A circuit as set forth in claim 2, further comprising filter means inserted in said two channels for preventing entry of said control frequency.

4. A circuit as set forth in claim 2, further comprising filter means inserted in said direct current potential conductive means for preventing entry of pulse frequencies.

5. A system for the transmission of stereophonic signals over a single carrier frequency, said system including a transmitter and a receiver, said transmitter comprising: a transmitter modulator; two stereo microphone channels; a switch for periodically and alternatingly connecting said channels to said transmitter modulator; a control oscillator connected to said switch for supplying thereto oscillations of supersonic frequency; a phase shifter connected to the output of said oscillator for producing a 90° phase shift; means for connecting the output of said phase shifter to said modulator; means for transmitting the output of said modulator; and a transmitting circuit for transmitting the output of said modulator; and said receiver comprising: a receiving circuit for receiving the output of said transmitting means; a rectifier bridge including four rectifier elements in cathode-to-anode connection; a first winding connected across one diagonal of said bridge; two output channels separately connected to the remaining two bridge corners; an oscillator producing oscillations of a frequency similar to said superimposed control frequency; a second winding inductively coupled to said first winding and connected to said oscillator for transmitting the oscillations produced by the oscillator to said first winding; direct current potential conductive means interconnecting one of said last-mentioned bridge corners and the control circuit of said oscillator; and means for feeding the received signal and said superimposed frequency to a center tap of said first winding.

References Cited in the file of this patent

UNITED STATES PATENTS 2,352,634 Hull ---------------------- July 4, 1944